July 27, 1965 A. G. RATZ 3,197,625

CROSS CORRELATOR

Filed Oct. 1, 1958 2 Sheets-Sheet 1

INVENTOR
ALFRED G. RATZ

BY Hurvitz & Rose

ATTORNEYS

INVENTOR
ALFRED G. RATZ
BY Hurvitz & Rose
ATTORNEYS

United States Patent Office 3,197,625
Patented July 27, 1965

3,197,625
CROSS CORRELATOR

Alfred G. Ratz, Trenton, N.J., assignor, by mesne assignments, to Electro-Mechanical Research, Inc., Sarasota, Fla., a corporation of Connecticut Filed Oct. 1, 1958, Ser. No. 764,613
11 Claims. (Cl. 235—181)

The present invention relates generally to cross-correlator computers, and more particularly to frequency scanning cross-correlator computers.

Briefly describing the present invention, in its generic aspects, a source of randomly varying signal $x(t)$ is to be correlated with a further signal $y(t)$. For example, $x(t)$ may represent plural random stimuli, as vibration, shock and the like, applied to a transducer and $y(t)$ may represent the output of the transducer. It may be desired to determine the effect of each stimulus separately on the output of the transducer. To effect the correlation, the signals $x(t)$ and $y(t)$ are analyzed to form their spectra. For each frequency, in-phase and out-of-phase components are correlated by multiplying and integrating the product of multiplication.

The signals subject to comparison may be derived directly from a telemetering receiver, or from transducers, or shake tables, or may be derived from magnetic tape recordings. In the latter case, if the duration of the usable portion of the record is not sufficient to enable a complete analysis, the tape may be formed as an endless loop which may be repetitively analyzed.

To simplify the present exposition, it will be assumed that $x(t)$ and $y(t)$ have been recorded on endless loops of magnetic tape and are available simultaneously. A significant band of frequencies may be taken to extend from 100 c.p.s. to 10 kc.

It is, accordingly, a primary object of the invention to provide a system for computing cross-correlation spectra.

It is a more specific object of the invention to provide a system for computing the co-phasal and quadrature correlation spectra of two functions.

The above and still further objects, features and advantages of the present invention will become apparent upon consideration of the following detailed description of one specific embodiment thereof, especially when taken in conjunction with the accompanying drawings, wherein.

Figure 1:
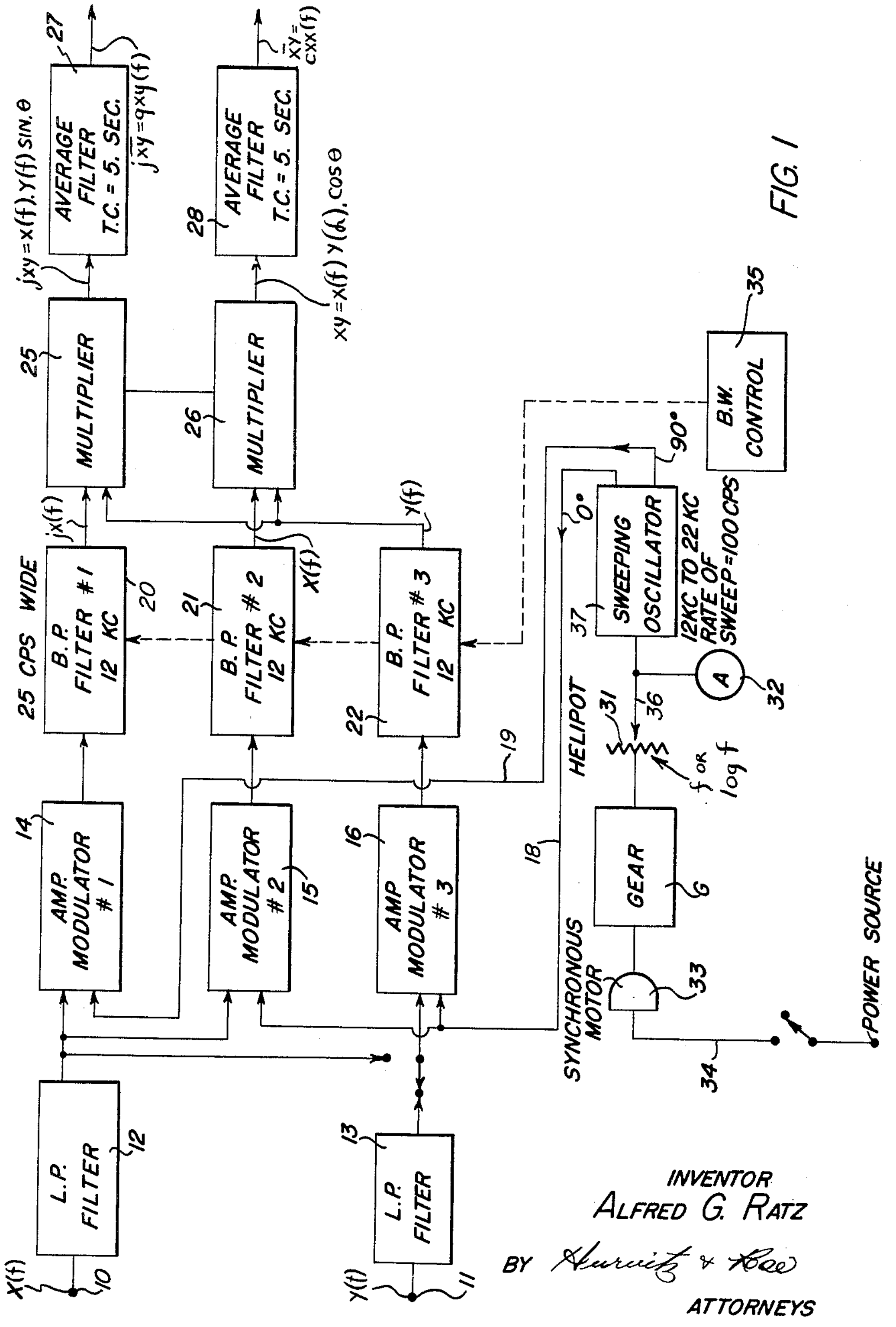
FIGURE 1 is a block diagram of a system according to the invention.

Referring now more specifically to the accompanying drawings, the reference numeral 10 denotes an input terminal for a first signal identified as $x(t)$ while the reference numeral 11 denotes a further input terminal for another signal identifiable as $y(t)$. The signals $x(t)$ and $y(t)$ may be derived from magnetic tape reproducers which are driven together in synchronism or may represent two signals which are in time correlation, one signal representing cause and the other representing effect in a transducer or similar type of responsive system. One possible mode of reproduction is to utilize a single tape for both signals and to read the signals out by means of two reproducing heads, so that time displacement between the signals cannot occur.

The signal $x(t)$ is applied to a low-pass filter 12 and the signal $y(t)$ to a low-pass filter 13, the filters being designed to exclude frequencies above the frequencies of interest. For the sake of example, it may be assumed that a specific embodiment of the present invention is employed to analyze signals in the band 100 c.p.s. to 10,000 c.p.s., in which case the filters 12 and 13 may each have a cut-off at about 10,000 c.p.s.

The output of the filter 12, $x(t)$, is applied in parallel to amplitude modulators No. 1 and No. 2, which are identified by the reference numerals 14 and 15, while the signal $y(t)$ as it appears at the output of the filter 13 is applied to an amplitude modulator No. 3 identified by the reference numeral 16. Modulators 14, 15, and 16 are also supplied with signals derived from a frequency scanning or sweeping oscillator 17. The oscillator 17 provides a square-wave output, the frequency of the square wave varying over the band 12 kc. to 22 kc. for a specific application herein described, and appears on two output leads 18 and 19 in 90° separated phases. The sweeping oscillator 17 varies its square wave output frequency over the range 12 kc. to 22 kc., at a preferred rate of change of 100 c.p.s. per second. More specifically, the signal appearing on the lead 18 is at zero phase while the signal appearing on the lead 19 is at 90° phase. The zero degree phase signal is applied in parallel to the modulators 15 and 16, while the 90° phase signal on the lead 19 is applied to the modulator 14.

The output of the modulator 14 is applied to a band-pass filter 20. The outputs of the modulators 15 and 16 are likewise applied to band-pass filters 21 and 22, respectively. The several band-pass filters have a center frequency of 12 kc. and may have band widths of about 25 c.p.s. Since the signal applied to the amplitude modulator 14 consists of $x(t)$ together with sweeping square waves at 90° phase relation, the output of the band pass filter 20 may be considered to have a 90° relative phase and is represented by the signal $jX(f)$. The amplitude modulator 15 is supplied with signal $x(t)$ together with a zero phase sweeping oscillation. The output of the band-pass filter 21 is at zero phase and is represented as $X(f)$. Since the modulator 16 is supplied with a signal $y(t)$ together with a zero phase sweeping oscillation, the output of the band-pass filter 22 may be described as $Y(f)$ and has zero relative phase.

The signals $jX(f)$ and $Y(f)$ are applied to a multiplier 25, while the signals $X(f)$ and $Y(f)$ are applied to multiplier 26. The outputs of the mutlipliers are, accordingly, as follows: for the multiplier 25, the output is $X(f)\cdot Y(f)\cdot\sin\theta$, while the output of the multiplier 26 is $X(f)\cdot Y(f)\cdot\cos\theta$, where $\theta$ is the phase angle between $X(f)$ and $Y(f)$ for any frequency $f$.

The signal $jXY$ is applied to an averaging filter 27 having a convenient integration time constant, perhaps of the order of 5 seconds, and at the output of which appears as an averaged signal represented as $\overline{jXY}$, which is the quadrature cross-correlation spectrum $qxy(f)$. The output of the signal XY is applied to a further averaging filter 28, having likewise a time constant of the order of 5 seconds, and the output of the averaging filter 28 is $\overline{XY}$, which is the cross-correlation spectrum, or $cxy(f)$.

The sweeping oscillator 17 is a voltage responsive oscillator and, more specifically, may employ an astable multibrator providing very linear and stable voltage time relationships. It has been found possible to achieve both an adequately linear relationship between voltage applied to the oscillator and its frequency, and an extremely close match between successive alternations. Control voltage is supplied from a potentiometer 31, which may be arranged to provide a linear voltage as a function of motion of the slider of the potentiometer or a logarithmically varying voltage. If desired, the potentiometer may be linear and its output may be converted to a logarithmic output by means of suitable computer circuits. The voltage on the slider of the potentiometer 31 may be derived for application at a frequency base line to a cathode ray tube, recorder, or the like, 32, where the output functions of the system are desired to be plotted.

The potentiometer 31 may be driven through a reducing gear G from a synchronous motor 33 energized from a suitable power source 34. The band widths of the filters 20, 21 and 22 may be subjected to control in conventional fashion by means of a band width control device 35, which can adjust the band pass of the bandpass filters 20, 21, 22 to be smaller or greater than the specified preferred value of 25 c.p.s.

Figure 2:
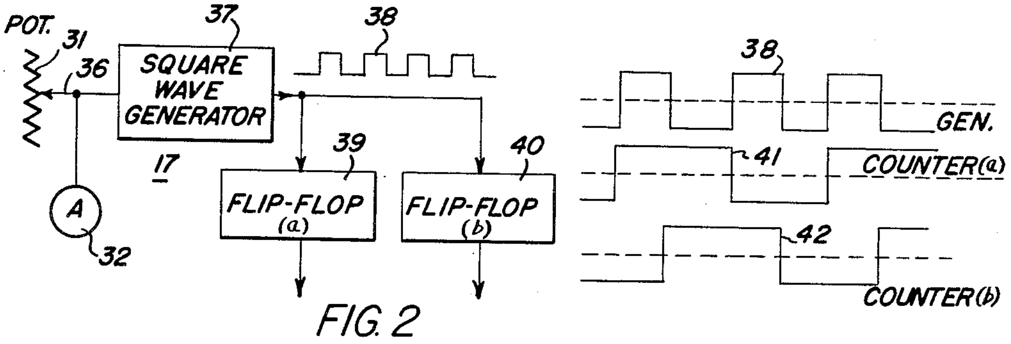
FIGURE 2 is a block diagram of a sweeping square-wave oscillator providing outputs at locked quadrature phases.

Reference is now made to FIGURE 2 of the accompanying drawings, wherein is illustrated in block diagram an embodiment of the sweeping oscillator 17, as well as certain wave forms pertaining thereto. The potentiometer 31 applies a signal to a lead 36 in the form of a control voltage. The latter controls the frequency of a square wave generator 37, the output of which is a train of square-waves 38 having a frequency which is a linear function of the control voltage on the lead 36. The train of square waves 38 is applied in parallel to two counters or flip-flops 39 and 40. The counter 39 is triggered from the leading edges of the wave 38 while the counter 40 is triggered from the trailing edges of the wave 38. Accordingly, the frequency of the output signal derivable from the counters 39 and 40 are at half the frequency of the square wave 38, but the phases of the square waves derivable from the counters 39 and 40, which are illustrated at 41 and 42, are 90° apart since the time interval between the leading and trailing edge of every cycle of the wave form 38 is equal to ¼ cycle of the wave forms 41 and 42.

Since the output of the sweeping oscillator 17 is a square-wave train, the modulators 14, 15, and 16 may be constituted of simple switching circuits. The use of switching circuits in this connection permits a very accurate matching of the modulators 14, 15, and 16, so that each provides an output of equal magnitude in response to input voltages of any given value.

Figure 3:
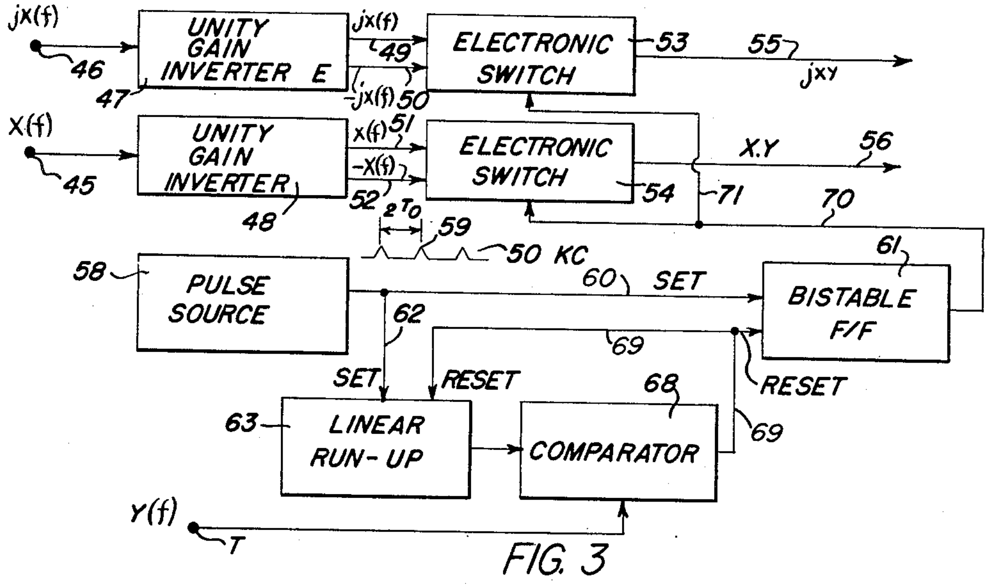
FIGURE 3 is a block diagram of a function multiplier according to the invention.
Figure 4:
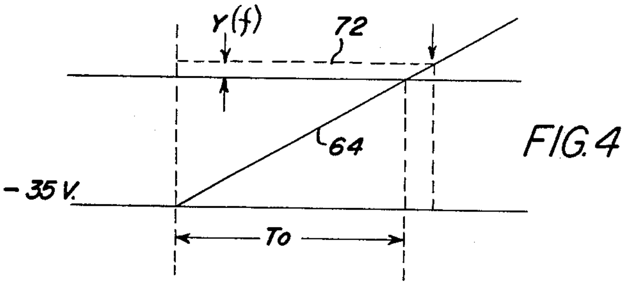
FIGURE 4 is a plot of a time function useful in explaining the operation of the multiplier of FIGURE 3.

The multipliers 25 and 26 are illustrated in FIGURE 3 of the accompanying drawings, the circuit of FIGURE 3 being explained by reference to wave forms illustrated in FIGURE 4 of the accompanying drawings. In FIGURE 3 the signal $X(f)$ is applied to a terminal 45, and the signal $jX(f)$ to a terminal 46, while the signal $Y(f)$ is applied to a terminal T. The terminal 46 is applied in cascade with a unity gain inverter 47 which provides outputs on two leads 49 and 50 of signals $jX(f)$ *and* $-jX(f)$, respectively, the minus sign indicating phase opposition. Similarly, the terminal 45 is connected in cascade with the unity gain inverter, 48, which provides on output leads 51 and 52 the signals $X(f)$ and $-X(f)$, respectively, the minus sign again indicating phase inversion. The signals provided on the leads 49 and 50 are applied to an electronic switch 53 and the signals available on leads 51 and 52 are applied to an electronic switch 54. An output lead 55 derives from the switch 53, and a further output lead 56 derives from the electronic switch 54. A pulse source 58 is provided which generates equally spaced pulses 59, which may be unidirectional. These pulses are fed via lead 60 to bi-stable flip-flop 61 and serve to set the latter. They are also applied via a lead 62 to a linear run-up circuit and serve to set the latter at a starting point. The starting point is established at minus 35 volts below ground, as indicated in FIGURE 4, wherein the linearly increasing voltage provided by the linear run up circuit 63 is identified by the reference numeral 64. The terminal T is connected to a comparator 68 to which is also applied the output wave form 64 derived from the linear run up circuit 63, so that upon effecting a comparison of the two input waves applied thereto the comparator 68 provides an output pulse on leads 69, which is applied to reset the bi-stable flip-flop 61 and also to reset the linear run up 63.

The output of the bi-stable flip-flop 61 is supplied via leads 70 and 71 in parallel to the electronic switches 53 and 54, and the electronic switches are arranged to pass either the signal on the lead 49 or the signal on the lead 50 for the switch 53 and the signal on the lead 51 or the signal on the lead 52 for the switch 54, according to whether the bistable flip-flop 61 is in its set or reset condition.

Describing now the operation of the multiplier of FIGURE 3 and assuming that the pulse source 58 has a pulse frequency of 50 kc. and produces ¼ microsecond pulses, each pulse triggers the linear run up circuit 63. Starting the wave form 64 at its initial level of −35 volts, when the wave form 64 equals the level of the input signal $Y(f)$ indicated at 72, a pulse is produced by the comparator 68 which serves to reset the linear run up 63 to its initial value. Accordingly, the linear run up continuously and repetitively proceeds from −35 volts to the value $Y(f)$. Initiation of each cycle of operation occurring in response to one of the pulses 59. The rate of rise to the run up is selected to be 3.40 volts per microsecond. Accordingly, if $Y(f)$ is zero, the comparator produces a pulse train set in time exactly midway between the pulses of the train 59.

Pulses from pulse source 58 are used to set the bistable flip-flop 61, while pulses from comparator 68 are used to reset it. During the time of set $X(f)$ passes electronic switch 54, and during time of reset $-X(f)$ passes. The total output from switch 54 is thus proportional to the product of $X(f)Y(f)$. If one assumes that $Y(f)$ equals zero, then equal amounts of $+X(f)$ and $-X(f)$ will pass through the switch 53, and the product $X \cdot Y$ will be zero. The value of $Y(f)$ may be positive or negative in a physical system. If $Y(f)$ is maximum positive, the $+X(f)$ pulse will be maximum and the $-X(f)$ pulse zero, assuming that $X(f)$ at the input terminal 45 is positive. If $Y(f)$ is maximum negative, and $X(f)$ positive, the timing of the output pulses from comparator 68 will pass $-X(f)$ from switch 54 during the entire switching cycle, to provide a negative value of $X \cdot Y$. The system of FIGURE 3 operates, in broad principle, by multiplying pulse amplitude, equal to $X(f)$, by pulse length, equal to $Y(f)$, to provide a product output $X \cdot Y$ on leads 56. This product can be positive or negative, depending on the algebraic signs of $X(f)$ and $Y(f)$.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. A cross correlator comprising a source of first wide band signal $x(t)$, a source of second wide band signal $y(t)$, each of said signals $x(t)$ and $y(t)$, having a relatively extensive Fourier spectrum, means for periodically and concurrently performing a selection of sample narrow band signals of corresponding frequency existing at substantially corresponding times in said signals $x(t)$ and $y(t)$ for a range of frequencies, means for continuously multiplying said sample signals during said selection to provide a product signal during said selection over said range of frequencies and means for continuously integrating said product signal during said selection over a substantial time interval at least as long as the period of time required by said selection over said range of frequencies.

2. The combination according to claim 1 wherein said samples are co-phasal.

3. The combination according to claim 1 wherein said samples are in quadrature phase.

4. In combination, a first source of wide band signals $x(t)$, where $t$ is time, a second source of wide band signals $y(t)$, first, second and third modulators, means for applying said signal $x(t)$ to said first and second modulators, respectively, means for applying said signal $y(t)$ to said third modulator only, a source of first and second frequency scanning signals having identical frequencies at each instant of time and having phases separated by substantially 90°, means for applying said first frequency scanning signal to said second and third modulators only, means for applying said second frequency scanning signal to said first modulator only, three substantially identical band pass filters of narrow pass band connected one in cascade with each of said modulators for deriving heterodyne products therefrom, the signals deriving from said filters being respectively X, Y and jX, where X derives from $x(t)$, where Y derives from $Y(t)$ and where jX indicates a quadrature phase relation with X, means for forming the products jXY and (XY), and integrating means for forming the quantities $\overline{jXY}$ and $\overline{XY}$ where the bar sign indicates an integrated value, where XY equals $XY \cos \theta$ and $jXY = XY \sin \theta$ and where $\theta$ is the phase angle between X and Y.

5. A correlation function computer comprising, a source of a first wide band signal $x(t)$, a source of a second wide band signal $y(t)$, where $t$ is time, a first modulator responsive to $x(t)$, a second modulator responsive to $y(t)$, a source of frequency scanning oscillations scanning over a band width equal at least to the band width of $x(t)$, means for applying said frequency scanning oscillations jointly to said first and second modulators for heterodyning with $x(t)$ and $y(t)$, a separate narrow band filter in cascade with each of said modulators for selecting the same heterodyne frequency product from each of said modulators in the form of signals $X(f)$ and $Y(f)$, means for forming the product $X(f)Y(f)$ continously during said scanning, and means for integrating said product over a substantial time interval at least approximately as long as the time of said scanning over said band.

6. A cross correlator comprising a source of first wide band signal $x(t)$, a source of second wide band signal $y(t)$, each of said signals $x(t)$ and $y(t)$ having a relatively extensive Fourier spectrum, frequency scanning means for concurrently selecting sample narrow band signals of corresponding frequency existing at identical times in said signals $x(t)$ and $y(t)$ for a range of frequencies taken in succession, means for continuously multiplying said sample signals during said selecting to provide a product signal during said selection over said range of frequencies and means for continually integrating said product signal during said selecting over a substantial time interval at least as long as the period of time required by said selection over said range of frequencies, said means for concurrently selecting comprising first and second amplitude modulators responsive to said wide band signals $x(t)$ and $y(t)$ respectively, and a source of frequency scanning local oscillations connected to said amplitude modulators, said local oscillations being square waves.

7. The combination according to claim 6 wherein said local oscillations are co-phasal square waves applied to both of said amplitude modulators.

8. The combination according to claim 6 wherein said local oscillations applied to individual ones of said amplitude modulators are time separated by 90°, where 360° is the time of one complete cycle of said square waves.

9. The combination according to claim 6 wherein said source of local oscillations includes a square wave oscillator arranged and adapted to vary in frequency as a function of control voltage, a first flip-flop responsive only to leading edges of said square waves, and a second flip-flop responsive only to trailing edges of said square waves, and means connecting said flip-flops, respectively, to said amplitude modulators, respectively.

10. In combination, a first source of wide band signals $x(t)$, where $t$ is time, a second source of wide band signals $y(t)$, first, second and third modulators, means for applying said signal $x(t)$ to said first and second modulators, respectively, means for applying said signal $y(t)$ to said third modulator only, a source of first and second frequency scanning signals having identical frequencies at each instant of time and having phases separated by 90°, means for applying said first frequency scanning signal to said second and third modulators only, means for applying said second frequency scanning signal to said first modulator only, three substantially identical band pass filters of narow pass band connected one in cascade with each of said modulators for deriving heterodyne products therefrom, the signals deriving from said filters being respectively X, Y and jX, where X derives from $x(t)$, where Y derives from $Y(t)$ and where jX indicates a quadrature phase relation with X, means for forming the quantities $\overline{jXY}$ and $\overline{XY}$ where the bar sign indicates an integrated value, where $XY = XY \cos \theta$ and $jXY = XY \sin \theta$ and where $\theta$ is the phase angle between X and Y, said frequency scanning signals being square waves.

11. The combination according to claim 10 wherein is provided means for generating said square waves, said last means comprising a voltage responsive oscillator generating square waves, and flip-flops responsive to said square waves to provide said frequency scanning signals.

References Cited by the Examiner

UNITED STATES PATENTS

| | | | |
|---|---|---|---|
| 2,166,991 | 7/39 | Guanella | 235—181 |
| 2,262,931 | 11/41 | Guanella | 235—181 X |
| 2,643,819 | 6/53 | Yee et al. | 235—181 |
| 2,732,496 | 1/56 | Slonczewski | 331—178 |
| 2,840,308 | 6/58 | Van Horne | 235—181 |
| 2,881,318 | 4/59 | Hughes et al. | 331—178 |
| 2,896,162 | 7/59 | Berger et al. | 235—181 |

MALCOLM A. MORRISON, *Primary Examiner.*

CORNELIUS D. ANGEL, LEO SMILOW, *Examiners.*